(12) United States Patent
Kuriyama et al.

(10) Patent No.: US 8,398,011 B2
(45) Date of Patent: Mar. 19, 2013

(54) FISHING REEL

(75) Inventors: Hiroaki Kuriyama, Osaka (JP); Hirokazu Hirayama, Osaka (JP)

(73) Assignee: Shimano Inc., Osaka (JP)

( * ) Notice: Subject to any disclaimer, the term of this patent is extended or adjusted under 35 U.S.C. 154(b) by 169 days.

(21) Appl. No.: 13/161,886

(22) Filed: Jun. 16, 2011

(65) Prior Publication Data
US 2011/0315802 A1  Dec. 29, 2011

(30) Foreign Application Priority Data
Jun. 25, 2010  (JP) .................................. 2010-145183

(51) Int. Cl.
*A01K 89/01* (2006.01)
(52) U.S. Cl. ........................ 242/223; 242/224
(58) Field of Classification Search .................. 242/223, 242/224
See application file for complete search history.

(56) References Cited

U.S. PATENT DOCUMENTS

| | | | | |
|---|---|---|---|---|
| 4,347,993 | A * | 9/1982 | Leonard | 242/413.3 |
| 5,219,131 | A | 6/1993 | Furomoto | |
| 5,479,831 | A | 1/1996 | Hirose | |
| 5,581,930 | A * | 12/1996 | Langer | 43/17 |
| 5,639,038 | A | 6/1997 | Hirose | |
| 5,831,417 | A * | 11/1998 | Chu | 322/1 |
| 7,188,793 | B2 * | 3/2007 | Ikuta et al. | 242/223 |
| 7,434,757 | B2 * | 10/2008 | Beckham | 242/223 |
| 7,784,724 | B2 * | 8/2010 | Beckham | 242/223 |
| 2001/0040097 | A1 * | 11/2001 | Arao et al. | 205/82 |
| 2004/0124297 | A1 * | 7/2004 | Steer | 242/223 |
| 2005/0133650 | A1 * | 6/2005 | Stiner et al. | 242/223 |

FOREIGN PATENT DOCUMENTS

| | | | |
|---|---|---|---|
| JP | 02083841 A | * | 3/1990 |
| JP | H07-039284 A | | 2/1995 |
| JP | 2005-117902 A | | 5/2005 |
| JP | 2005-270017 A | | 10/2005 |

OTHER PUBLICATIONS

Extended European Search Report of the corresponding European Application No. 11168337.1, dated Dec. 17, 2012.

* cited by examiner

*Primary Examiner* — Emmanuel M Marcelo
(74) *Attorney, Agent, or Firm* — Global IP Counselors, LLP

(57) ABSTRACT

A fishing reel for winding a fishing line includes a reel unit, a spool, a handle, a tension detection section, a temperature detection section, a detected tension correction section, and a corrected tension output section. The spool is rotatably attached to the reel unit and configured to wind the fishing line thereon. The handle is mounted to the reel unit, and configured to rotate the spool. The tension detection section is configured to detect tension applied on the fishing line by converting the tension into an electric signal. The temperature detection section is disposed to detect temperature of the tension detection section. The detected tension correction section is configured to correct the tension after being detected on the basis of the temperature of the tension detection section after being detected. The corrected tension output section is configured to output the tension after being corrected by the detected tension correction section.

9 Claims, 10 Drawing Sheets

| | | | | | |
|---|---|---|---|---|---|
| | | XXXXX | | XXXXX | |
| 1 | DISTANCE | 120.0m | 4 DISTANCE | 0.0m | |
| | LINE TENSION | 15.0kg | LINE TENSION | 0.0kg | |
| | LINE SPEED | 10.0km/h | LINE SPEED | 0.0km/h | |
| 2 | DISTANCE | 0.0m | 5 | | |
| | LINE TENSION | 0.0kg | | | |
| | LINE SPEED | 0.0km/h | | | |
| 3 | | | 6 | | |

FIG. 10

001
FISHING REEL

CROSS-REFERENCE TO RELATED APPLICATIONS

This application claims priority to Japanese Patent Application No. 2010-145183 filed on Jun. 25, 2010, the entirety of which is hereby incorporated by reference in its entirety.

BACKGROUND OF THE INVENTION

1. Field of the Invention

The present invention relates to a fishing reel, particularly to a fishing reel attached to a fishing rod for winding and releasing a fishing line.

2. Background Art

The fishing reels generally include a reel unit, a spool rotatably attached to the reel unit, and a handle for rotating the spool. The spool is attached onto a spool shaft supported by the reel unit, whereas the handle is fixedly attached onto a handle shaft while being disposed in parallel to the spool shaft. Japanese Laid-open Patent Application Publication No. JP-A-2005-270017 describes one of the well-known fishing reels of the aforementioned type. The fishing reel of the publication further includes, for instance, a star drag, a drag mechanism, and a torque sensor. The start drag is attached onto the handle shaft. The drag mechanism, such as a lever drag, is attached onto the spool shaft for braking rotation of the spool. The torque sensor detects torque applied on the drag mechanism. Tension applied on the fishing reel can be herein calculated using tension applied on the drag mechanism (i.e., the tension detected by the torque sensor). Therefore, an angler can reliably grasp tension applied on the fishing line, which is a current fishing condition in real time including information regarding whether or not a fish bites, a pulling level of a fish and the like, by displaying the tension applied on the fishing line on a display unit of a fishing information display device or a display unit of a counter case disposed on the top of the reel unit, for instance.

According to the well-known fishing reels, the tension on the fishing line is detected by the torque sensor provided for detecting the toque applied on the drag mechanism. In general, the drag mechanism is configured to brake rotation of the spool by contact friction when a plurality of drag plates is abutted to the spool. However, the drag plates are heated due to increase in contact friction thereof in some cases, for instance, when a fish pulls the fishing line quite strongly during activation of the drag mechanism. When the drag mechanism is thus heated, the torque sensor disposed in the vicinity of the dram mechanism increases its temperature. Accordingly, the torque sensor can detect torque imprecisely. Such an imprecisely detected torque value results in a large difference between an actual tension value and a calculated tension value calculated based on the detected toque value. In other words, there are high chances that an angler cannot precisely grasp the tension applied on the fishing line.

In view of the above, the present invention addresses a need to produce a fishing reel for allowing an angler to precisely grasp the tension applied on the fishing line.

SUMMARY

The foregoing objects can basically be attained by providing a fishing reel including a reel unit, a spool, a handle, a tension detection section, a temperature detection section, a detected tension correction section, and a corrected tension output section. The spool is rotatably attached to the reel unit, and is configured to wind the fishing line thereon. The handle is mounted to the reel unit, and is configured to rotate the spool. The tension detection section is configured to detect tension applied on the fishing line by converting the tension into an electric signal. The temperature detection section is disposed in a vicinity of the tension detection section, and disposed to detect temperature of the tension detection section. The detected tension correction section is configured to correct the tension after being detected on the basis of the temperature of the tension detection section after being detected. The corrected tension output section is configured to output the tension after being corrected by the detected tension correction section.

BRIEF DESCRIPTION OF THE DRAWINGS

Referring now to the attached drawings which form a part of this original disclosure:

FIG. 10 is a plan view of a display unit of the fishing information display device of another exemplary embodiment.

DETAILED DESCRIPTION OF EXEMPLARY EMBODIMENTS

Figure 1:
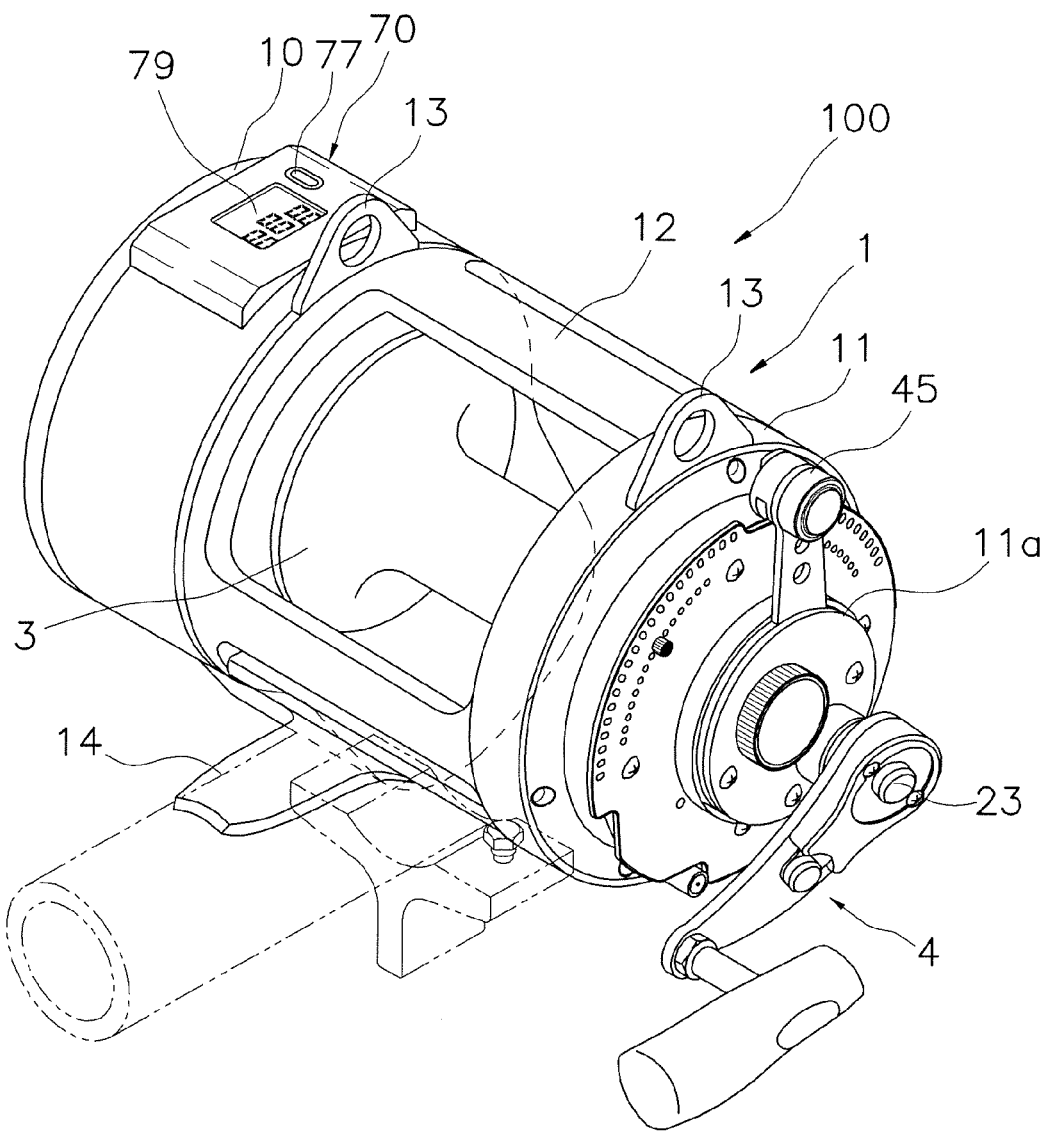
FIG. 1 is a perspective view of a fishing reel adopting an exemplary embodiment of the present invention.
Figure 2:
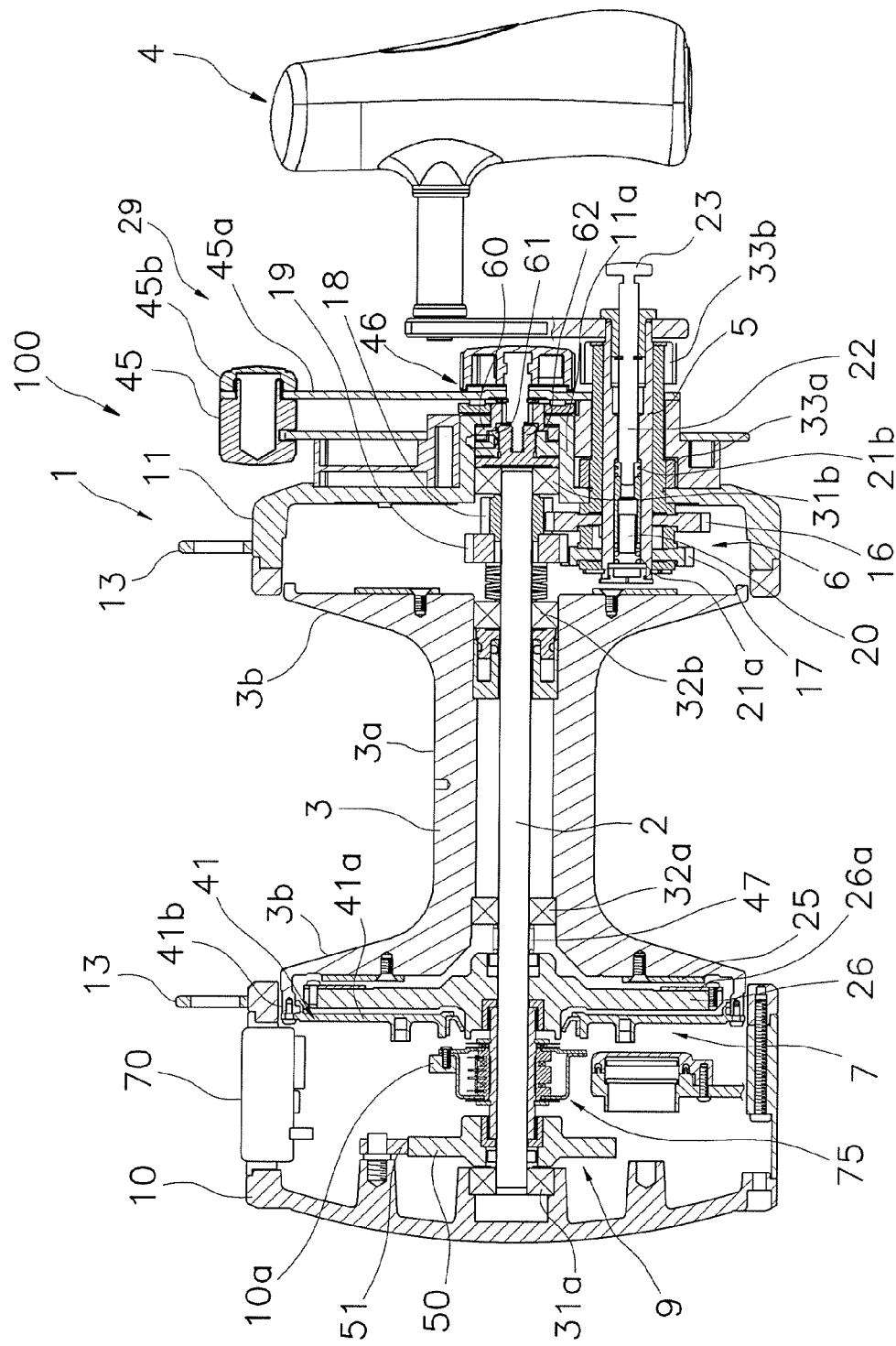
FIG. 2 is a cross-sectional view of the fishing reel.

As illustrated in FIGS. 1 and 2, a fishing reel 100 adopting an exemplary embodiment of the present invention is a large dual-bearing reel for trolling. The fishing reel 100 includes a tubular reel unit 1, a spool shaft 2, a spool 3, and a handle 4. The spool shaft 2 is rotatably attached to the center part of the reel unit 1. The spool 3 is supported by the spool shaft 2 while being allowed to rotate but prevented from axially moving. The handle 4 is disposed lateral to the reel unit 1. Further, the fishing reel 100 includes a rotation transmission mechanism 6, a lever drag mechanism 7, and an anti-reverse mechanism 9 in the inside of the reel unit 1. The rotation transmission mechanism 6 is configured to transmit rotation of the handle 4 to the spool 3. The lever drag mechanism 7 is configured to brake rotation of the spool 3 in a fishing line release direction. The anti-reverse mechanism 9 is configured to prevent rotation of the spool 3 in the fishing line release direction.

The reel unit 1 includes a first side plate 10 (a left side plate), a second side plate 10 (a right side plate) and a reel body 12. Each of the first and second side plates 10 and 11 is a closed end tubular member made of metal. The reel body 12 is a perforated tubular member made of metal. The first and second side plates 10 and 11 are concentrically joined to the both axial ends of the reel body 12 by a socket joint. Under the condition, the first and second side plates 10 are fixed to the reel body 12 by a plurality of fixation screws. The first and second side plates 10 and 11 support the both axial ends of the spool shaft 2 with roughly the center parts thereof for allowing the spool shaft 2 to rotate.

A pair of harness lugs 13 is attached to the top of the reel unit 1 at a predetermined interval for connecting the fishing reel to a single or plurality of reel harnesses. Specifically, one of the harness lugs 13 is disposed between the first side plate 10 and the reel body 12, whereas the other of the harness lugs 13 is disposed between the second side plate 11 and the reel body 12. On the other hand, a fishing rod attachment portion 14 is disposed on the bottom of the reel body 12 for attaching the fishing reel to a fishing rod.

Figure 3:
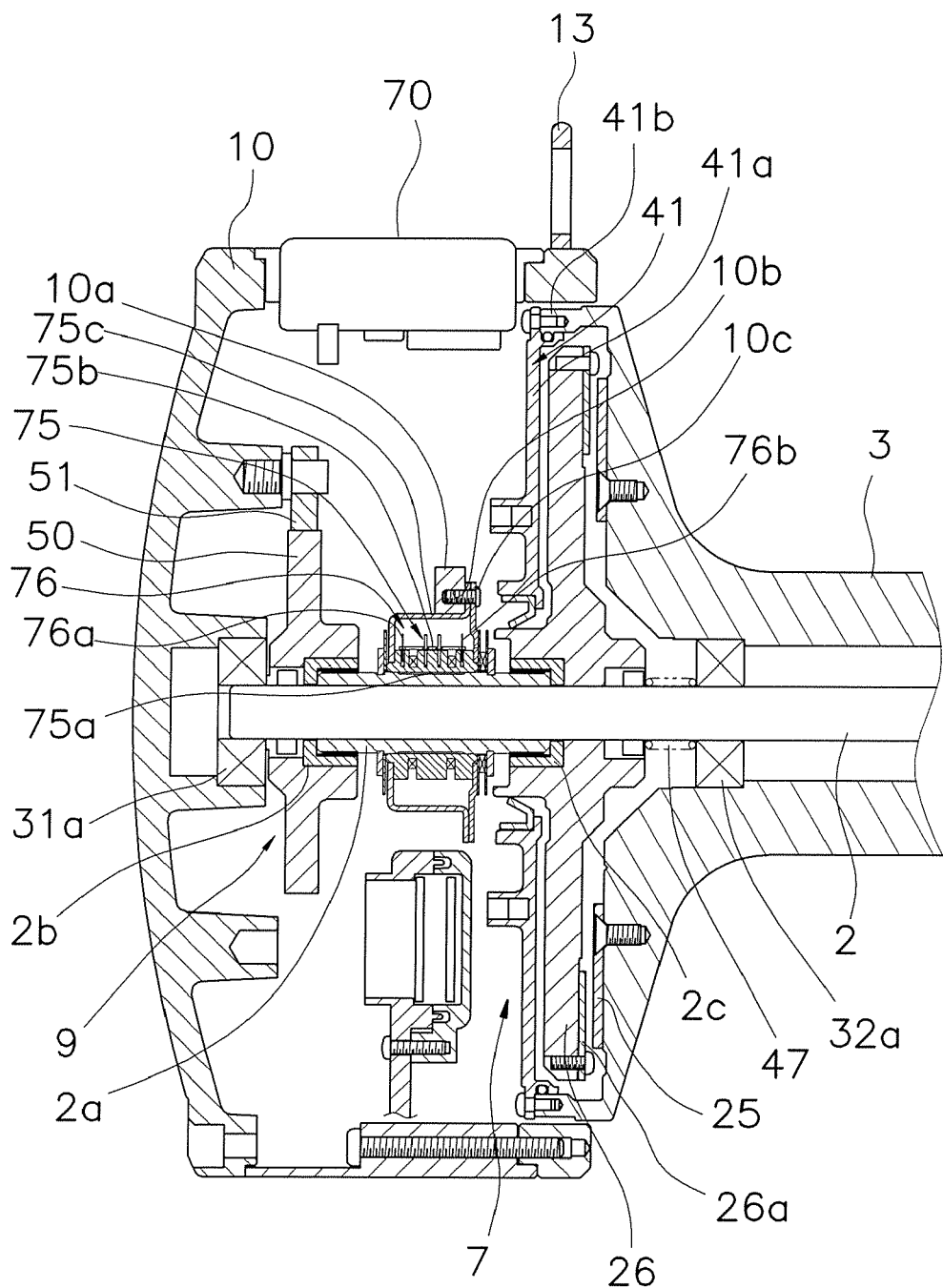
FIG. 3 is an enlarged cross-sectional side view of a left part of the fishing reel.

As illustrated in FIGS. 1 to 3, a box-like counter case 70 is disposed on the top of the first side plate 10 of the reel unit 1. The counter case 70 includes a display unit 79 and an operating unit 77 on the top surface thereof. The display unit 79 is configured to display the information of depth where a terminal tackle is positioned in the water (i.e., terminal tackle water depth information, corresponding to fishing line length), information of tension applied on the fishing line (i.e., corrected torque), information of release speed of the terminal tackle, and the like. The operating unit 77 is disposed on the front side of the display unit 79 for allowing an angler to execute a switching operation of the display contents displayed by the display unit 79.

Figure 4:
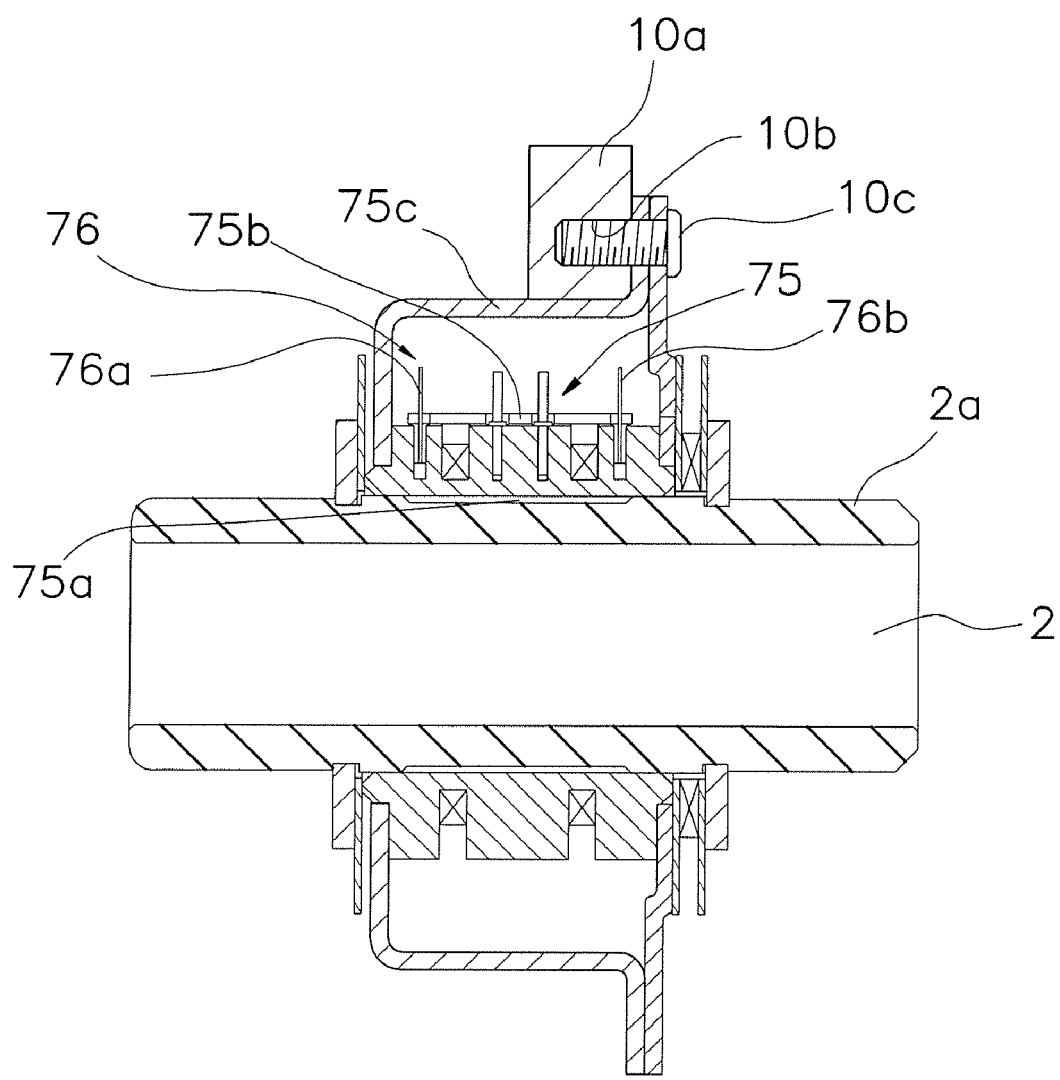
FIG. 4 is an enlarged cross-sectional view of a torque sensor of the fishing reel.

As illustrated in FIGS. 2 and 3, an attachment board 10*a* with a roughly disc shape is attached and fixed to the inside of the first side plate 10 of the reel unit 1. A variety of components are disposed on the attachment board 10*a*. For example, such components include: a control unit 73 (see FIG. 7) configured to execute a variety of controls, a storage unit 78 (see FIG. 7) storing a variety of information, a below-mentioned spool sensor 71 (see FIG. 7), a lead switch forming a part of a spool counter 72 (see FIG. 7), a board temperature sensor 69 (see FIG. 7) for detecting the temperature of a below-mentioned sensor board of the attachment board 10*a*, and a backup battery. As illustrated in FIGS. 2 to 4, a detection coil 75*b* of a below-mentioned torque sensor 75 and a holder case 75*c* for holding a temperature sensor 76 are further attached to the attachment board 10*a*. As illustrated in FIG. 4, the holder case 75*c* is a roughly cylindrical case member through which the spool shaft 2 penetrates. The holder case 75*c* is attached and fixed to the attachment board 10*a* by an attachment screw 10*c* screwed into a screw hole 10*b* formed in the attachment board 10*a*.

As illustrated in FIG. 2, the spool shaft 2 is rotatably supported by the first and second side plates 10 and 11 through a pair of a bearing 31*a* (left side bearing) and a bearing 31*b* (right side bearing) disposed onto the both axial ends of the spool shaft 2. Further, the spool 3 is rotatably supported by two bearings 32*a* and 32*b* disposed onto the spool shaft 2. The bearings 32*a* and 32*b* are separated from each other while being disposed between the bearings 31*a* and 31*b* in the axial direction. Specifically, the bearings 32*a* and 32*b* are disposed in the both axial ends of the spool 3. As illustrated in FIGS. 2 and 3, a ratchet wheel 50, which will be described below, of the anti-reverse mechanism 9 is abutted to the right side of an inner race of the bearing 31*a* disposed onto the left axial end of the spool shaft 2. On the other hand, a friction disc 26, which will be described below, of the lever drag mechanism 7 is abutted to the left side of an inner race of the left-side bearing 32*a* supporting the spool 3. As illustrated in FIGS. 3 and 4, a tubular member 2*a* with a tube-like shape is attached onto the outer periphery of the spool shaft 2 while being axially interposed between the ratchet wheel 50 of the anti-reverse mechanism 9 and the friction disc 26 of the lever drag mechanism 7. Further, a magnetostrictive element 75*a* of the torque sensor 75 is attached onto the outer periphery of the tubular member 2*a*. The detection coil 75*b* of the torque sensor 75 and the temperature sensor 76 are disposed on the outer peripheral side of the tubular member 2*a* where the magnetostrictive element 75*a* is attached, while being held by the holder case 75*c* attached and fixed to the attachment board 10*a*. A pair of a cap member 2*b* (left side cap member) and a cap member 2*c* (right side cap member), respectively having a closed end tubular shape, is disposed onto the both axial ends of the tubular member 2*a* as intervening members. Specifically, the cap member 2*b* is attached onto the left axial end of the tubular member 2*a* while the left end thereof abuts to the right end of the ratchet wheel 50 of the anti-reverse mechanism 9. In other words, the cap member 2*b* functions as an intervening member for preventing the left end of the tubular member 2*a* from directly making contact with the right end of the ratchet wheel 50 of the anti-reverse mechanism 9. On the other hand, the cap member 2*c* is attached onto the right axial end of the tubular member 2*a* while the right end thereof abuts to the left end of the friction disc 26 of the lever drag mechanism 7. In other words, the cap member 2*c* functions as an intervening member for preventing the right end of the tubular member 2*a* from directly making contact with the left end of the friction disc 26 of the lever drag mechanism 7.

As illustrated in FIG. 2, the spool 3 includes a bobbin trunk 3*a* and a pair of flanges 3*b* integrally formed with the axial ends of the bobbin trunk 3*a*.

As illustrated in FIG. 2, the handle 4 is fixed onto a protruding end of a tubular handle shaft 5 disposed in parallel to and below the spool shaft 2. The handle shaft 5 is rotatably supported by the reel unit 1 through two bearings 33*a* and 33*b*. The bearings 33*a* and 33*b* are disposed below a boss 11*a* while being axially separated from each other.

As illustrated in FIG. 2, the rotation transmission mechanism 6 includes a speed change mechanism configured to switch handle rotation speed between a high speed and a low speed. As illustrated in FIG. 2, the rotation transmission mechanism 6 includes a first gear 16, a second gear 17, a third gear 18, a fourth gear 19, an engaging piece 20, two compression springs 21*a* and 21*b*, and an operating shaft 22. The first gear 16 is used for winding the fishing line at a high speed, whereas the second gear 17 is used for winding the fishing line at a low speed. The first and second gears 16 and 17 are both rotatably supported onto the handle shaft 5 of the handle 4. The third gear 18 is meshed with the first gear 16, whereas the fourth gear 19 is meshed with the second gear 17. Under the condition, the third and fourth gears 18 and 19 are rotatably attached onto the spool shaft 2. The engaging piece 20 is configured to couple the handle shaft 5 to either the first gear 16 or the second gear 17 and transmit rotation therefrom to a coupled one of the first and second gears 16 and 17. The compression springs 21 and 21*b* are disposed on the both axial sides of the engaging piece 20 for positioning the engaging piece 20. The operating shaft 22 is configured to set the engaging piece 20 to be in a predetermined position. The operating shaft 22 protrudes to the outside from the handle shaft 5 while penetrating through the inside of the handle shaft 5. The protruding end (i.e., the right end) of the operating shaft 22 includes a slide-type stopper 23 disposed in the handle 4.

When the operating shaft 22 is pressed leftwards in the rotation transmission mechanism 6 with the aforementioned structure in FIG. 2, the engaging piece 20 is disposed in the second gear 17 and rotation of the handle 4 is transmitted to the fourth gear 19 through the second gear 17. The spool shaft 2 and the spool 3 thereby rotate at a low speed. When the slide-type stopper 23 is slid for pulling the operating shaft 22 rightwards in FIG. 2, on the other hand, the engaging piece 20 is disposed in the first gear 16 and rotation of the handle 4 is transmitted to the third gear 18 through the first gear 16. The spool shaft 2 and the spool 3 thereby rotate at a high speed.

As illustrated in FIG. 2, the lever drag mechanism 7 includes a brake disc 25, the friction disc 26, and a moving mechanism 29. The brake disc 25 is attached to the left side of the spool 3. The friction disc 26 is disposed on the left side of the brake disc 25 while being opposed thereto. The moving mechanism 29 is configured to reciprocate the spool 3 and the brake disc 25 in the axial direction of the spool shaft 2.

As illustrated in FIGS. 2 and 3, the brake disc 25 is a washer-like disc member made of, for instance, stainless. The brake disc 25 is attached to the end surface of the left-side flange 3b of the spool 3 by a plurality of attachment pins disposed at predetermined intervals along the circumferential direction thereof. The brake disc 25 is prevented from rotating with respect to the spool 3 but is allowed to move at a predetermined distance in the axial direction of the spool 3 for making contact with or separating away from the spool 3.

As illustrated in FIGS. 2 and 3, the friction disc 26 is opposed to the brake disc 25. The friction disc 26 is attached onto the spool shaft 2 while being movable in the axial direction of the spool shaft 2. A friction plate 26a is fixed to the friction disc 26 surface opposed to the brake disc 25 by screws. For example, the friction plate 26a is a ring plate made of abrasion resistant material such as carbon graphite, fiber reinforced resin or the like. The right end surface of the inner periphery of the friction disc 26 is abutted to the inner race of the bearing 32a disposed in the inner periphery of the spool 3 through a coil spring 47 of the moving mechanism 29. On the other hand, the left end surface of the inner periphery of the friction disc 26 is abutted to the ratchet wheel 50 of the anti-reverse mechanism 9 through the cap member 2c, the tubular member 2a, and the cap member 2b. The ratchet wheel 50 is fixedly (non-rotatably) attached to the outer peripheral surface of the cap member 2b. The ratchet wheel 50 is abutted to the inner race of the bearing 31a. The outer race of the bearing 31a is abutted to the first side plate 10. The friction disc 26 is thereby prevented from moving outwards in the axial direction of the spool shaft 2 (i.e., leftwards in FIG. 2). Further, the fiction disc 26 is prevented from rotating in the fishing line release direction by the ratchet wheel 50. The anti-reverse mechanism 9 is a claw type mechanism and includes the ratchet wheel 50 and a ratchet claw 51. The ratchet wheel 50 includes saw teeth on the outer periphery thereof. The ratchet claw 51 is disposed on the outer peripheral side of the ratchet wheel 50 for locking the saw teeth with the tip thereof. The ratchet claw 51 is pivotably attached to the inner surface of the first side plate 10. The ratchet claw 51 is urged for locking the saw teeth by a tension spring.

As illustrated in FIGS. 2 and 3, the outside of the friction disc 26 is covered with a drag cover 41. The drag cover 41 is made of, for instance, aluminum alloy for achieving good heat radiation. The drag cover 41 includes a cover body 41a and an attachment portion 41b. The cover body 41 is a saucer-like member having a circular opening in the center thereof. The attachment portion 41b is a ring member integrally formed with the outer peripheral surface of the cover body 41a. The cover body 41a includes a space in the inside thereof for containing the friction disc 26 and the brake disc 25. Further, a plurality of magnets, which form a part of a spool sensor 71 (see FIG. 7) and the spool counter 72 (see FIG. 7), is attached to the left surface of the cover body 41a while being opposed to a lead switch forming a part of the spool sensor 71 and the spool counter 72. The attachment portion 41b is fixed to the end surface of the flange 3b of the spool 3 by arbitrary fixation means such as a plurality of screws. The drag cover 41 is configured to unitarily rotate with the spool 3.

As illustrated in FIG. 2, the moving mechanism 29 includes a brake operating lever 45, a press mechanism 46, and the coil spring 47. The brake operating lever 45 is pivotably disposed in the reel unit 1. The press mechanism 46 is configured to press and move the spool 3 and the brake disc 25 leftwards in FIG. 2 in conjunction with a clockwise pivot of the brake operating lever 45. The coil spring 47 is configured to urge the friction disc 26 for moving the spool 3 and the brake disc 25 rightwards in FIG. 2 in conjunction with a counterclockwise pivot of the brake operating lever 45. The coil spring 47 is attached onto the outer periphery of the spool shaft 2 in a compressed state while being interposed between the friction disc 26 and the bearing 32a disposed in the inner periphery of the spool 3. The coil spring 47 is configured to urge the friction disc 26 and the spool 3 in opposite directions.

As illustrated in FIG. 2, the brake operating lever 45 is attached to the reel unit 1 while being pivotable between a brake release position and a maximum brake position. When pivoted in the clockwise direction, the brake operating lever 45 is set to be in the brake release position. When pivoted in the counterclockwise direction, on the other hand, the brake operating lever 45 is set to be in the maximum brake position. The brake operating lever 45 includes a lever portion 45a and a knob portion 45b. The lever portion 45a is pivotably attached onto the boss 11a. The knob portion 45b is fixed to the front end of the lever portion 45a. The base end of the lever portion 45a is non-rotatably held by a first cam member 60 forming a part of the press mechanism 46.

The press mechanism 46 includes the first cam member 60, a second cam member 61, and a press member 62. The first cam member 60 is attached to the inner peripheral surface of the boss 11a while being rotatable but axially non-movable. The second cam member 61 is configured to axially move in conjunction with rotation of the first cam member 60. The press member 62 is configured to axially move in conjunction with the second cam member 61. The first cam member 60 is a two-tier (large and small tier) tubular member configured to rotate in conjunction with pivot of the brake operating lever 45. Further, the first cam member 60 includes a tilt cam on the base-end surface of the large-diameter portion thereof. The second cam member 61 is a tubular member. The second cam member is attached to the inner peripheral surface of the boss 11a while being non-rotatable but axially movable. The second cam member 61 includes a tilt cam on the outer peripheral side end surface thereof opposed to the first cam member 60. The tilt cam of the second cam member 61 is configured to be engaged with the tilt cam of the first cam member 60. When the above two tilt cams are relatively rotated, rotary movement of the first cam member 60 is converted into axial linear movement of the second cam member 61. The second cam member 61 is thereby axially moved. The inner peripheral surface of the second cam member 61 is screwed onto the press member 62. The relative axial positional relation can be thereby adjusted between the second cam member 61 and the press member 62. In other words, drag force can be adjusted depending on the position of the brake operating lever 45.

Figure 7:
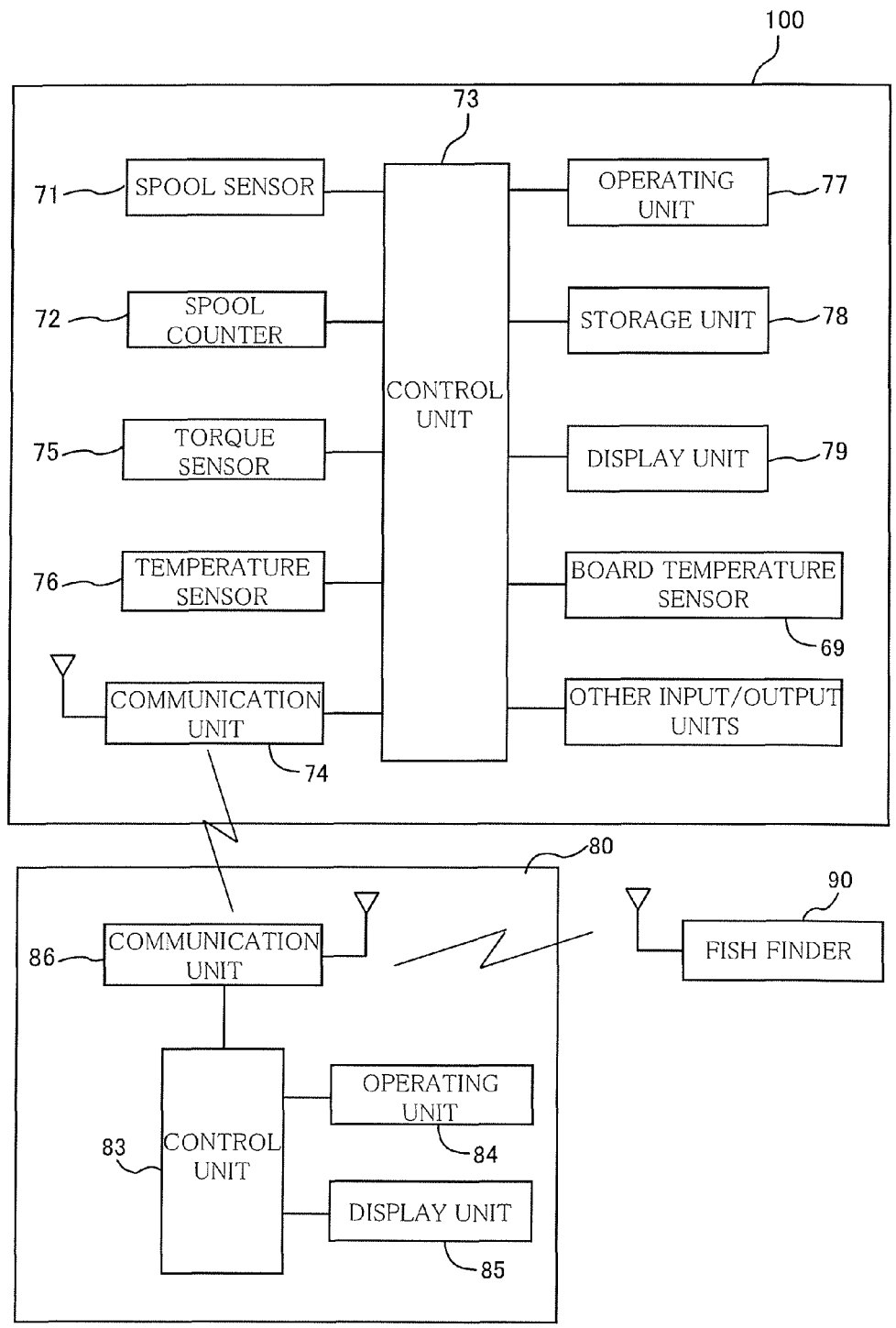
FIG. 7 is a control block diagram of the fishing reel.

As illustrated in FIGS. 2 and 3, the attachment board 10a is attached and fixed to the inside of the first side plate 10 of the reel unit 1. The control unit 73 (see FIG. 7), which is configured to execute a variety of controls, is attached to the attachment board 10a. As illustrated in FIG. 7, the control unit 73 is electrically connected to the spool sensor 71, the spool counter 72, the torque sensor 75, the temperature sensor 76, a communication unit 74, the operating unit 77, the storage unit 78, the display unit 79, the board temperature sensor 69, and other input/output units.

The control unit 73 includes a microcomputer including a variety of components, such as a CPU, a RAM, a ROM, and an I/O interface, which are disposed on the attachment board 10a. The control unit 73 is configured to execute a variety of control operations based on a control program preliminarily stored in the storage unit 78. For example, the control operations include a communication control processing for the communication unit 74, a display control processing for the display unit 79, a control processing of calculating the terminal tackle water depth information (i.e., fishing line length) and the release speed of the fishing line based on the data detected by the spool sensor 71 and the spool counter 72, and a control processing of calculating a corrected torque by correcting a detected torque based on the torque data detected by the torque sensor 75 and the temperature data detected by the temperature sensor 76 and the board temperature sensor 69. The storage unit 78 is formed by a nonvolatile memory such as an EEPROM, and preliminarily stores a variety of data such as the map data to be used for calculating the fishing line length.

The spool sensor 71 includes two lead switches aligned back and forth. The lead switches detect two magnets attached to a magnet wheel. The spool counter 72 counts the detection pulses emitted by the lead switches. The number of rotations of the reel can be thereby detected. Further, the rotational direction of the spool 3 can be detected based on which of the reel switches emits the detection pulse earlier.

The spool counter 72 is configured to count the number of times that the spool sensor 71 is turned on and off. The rotational position data regarding the number of spool rotations can be obtained from the counted value. The spool counter 72 is configured to reduce the counted value when the spool 3 rotates in the forward direction (i.e., in the fishing line release direction). On the other hand, the spool counter 72 is configured to increase the counted value when the spool 3 rotates in the reverse direction.

As illustrated in FIGS. 2 to 4, the torque sensor 75 is a magnetostrictive sensor including the magentostrictive element 75a and the detection coil 75b. The magnetostrictive element 75a is attached onto the tubular member 2a. The tubular member 2a is herein attached onto the outer periphery of the spool shaft 2 while being disposed between the ratchet wheel 50 of the anti-reverse mechanism 9 and the friction disc 26 of the lever drag mechanism 7. On the other hand, the detection coil 75b is held by the holder case 75c. The holder case 75c is herein attached and fixed to the attachment board 10a while being disposed on the surrounding of the magnetostrictive element 75a. For example, the magnetostrictive element 75a includes a soft magnetic member made of amorphous alloy foil. The magnetostrictive element 75a is wound about and fixed to the spool shaft 2 at a predetermined interval. The magnetostrictive element 75a includes grooves on the surface thereof. The grooves are slanted at different angles for producing magnetic anisotropy. The detection coil 75b has a cylindrical shape for enclosing the magnetostrictive element 75a. The self-inductance of the detection coil 75b varies in response to variation in the magnetic permeability of the magnetostrictive element 75a due to the torsion of the spool shaft 2. The detection coil 75b is connected to the control unit 73 (see FIG. 7). The detected torque, detected by the detection coil 75b, is transmitted to the control unit 73. Further, two sensors, forming the temperature sensor 76, are disposed on the both sides of the detection coil 75b in the axial direction. The temperature sensor 76 detects the temperature of the detection coil 75b.

As illustrated in FIGS. 3 and 4, the temperature sensor 76 is a thermistor attached to the detection coil 75b in a contactable state. The temperature sensor 76 includes a first temperature sensor 76a and a second temperature sensor 76b. The first temperature sensor 76a is disposed on the left side of the detection coil 75b, whereas the second temperature sensor 76b is disposed on the right side of the detection coil 75b. The first and second temperature sensors 76a and 76b, together with the detection coil 75b, are held by the holder case 75c attached and fixed to the attachment board 10a. The first and second temperature sensors 76a and 76b are connected to the control unit 73 (see FIG. 7). The temperatures of the detection coil 75b, detected by the first and second temperature sensors 76a and 76b, are transmitted to the control unit 73.

The board temperature sensor 69 (see FIG. 7) is a sensor for detecting the temperature of a sensor board where a sensor circuit connected to both the torque sensor 75 and the temperature sensor 76 is attached. The board temperature sensor 69 is disposed on the sensor board of the attachment board 10a. The board temperature sensor 69 is connected to the control unit 73 (see FIG. 7). The temperature of the sensor board, detected by the board temperature sensor 69, is transmitted to the control unit 73.

The control unit 73 is configured to execute a variety of controls for the display unit 79, the communication unit 74, and the like. The control unit 73 is also configured to execute a water depth calculation processing of calculating the terminal tackle water depth information. In the water depth calculation processing, the number of rotations of the spool 3 is converted into the terminal tackle water depth information by matching the number of rotations of the spool 3 counted by the spool counter 72 with the map data stored in the storage unit 78. The thus-obtained terminal tackle water depth information is transmitted to the display unit 79 and the communication unit 74 as numerical information.

Further, the control unit 73 is configured to execute a rotation speed calculation processing of calculating the rotation speed of the spool 3. In the rotation speed calculation processing, the rotation speed of the spool 3 per a unit time is calculated based on the number of rotations of the spool 3 counted by the spool counter 72 and the time information obtained from an internal clock of the control unit 73. The thus-obtained rotation speed information of the spool 3 is transmitted to the display unit 79 and the communication unit 74 as numerical information.

Yet further, the control unit 73 is configured to execute a detected tension correction calculation output processing of calculating and outputting a corrected tension by converting the detected torque of the spool shaft 2 detected by the torque sensor 75 into a calculated tension, and then correcting the calculated tension in accordance with both the temperature of the detection coil 75b detected by the temperature sensor 76 and the temperature of the sensor board detected by the board temperature sensor 69. In the detected tension correction calculation output processing, the detected torque of the spool shaft 2 is converted into a calculated torque based on the diameters, frictions and the like of the spool 3 and the lever drag mechanism 7. Further, the calculated torque is corrected in accordance with the winding diameter of the fishing line for calculating the corrected tension. The detected tension correction calculation output processing will be hereinafter specifically explained with reference to a control flowchart represented in FIG. 8.

First, the power is on when the operating unit 77 is kept pressed for a predetermined period of time. The initial setting is executed in Step S1. In the initial setting of Step S1, a variety of variables and flags are reset and the initial screen is displayed on the display unit 79.

Next in Step S2, the torque of the spool shaft 2 is detected. In Step S2, the detected torque detected by the torque sensor 75 is stored in the storage unit 78. The processing proceeds to Step S3.

In Step S3, the temperature of the detection coil 75b is detected by the temperature sensor 76. In Step S3, the temperature of the detection coil 75b, detected by the temperature sensor 76, is stored in the storage unit 78. The processing proceeds to Step S4.

In Step S4, the temperature of the sensor board is detected by the board temperature sensor 69. In Step S4, the temperature of the sensor board, detected by the board temperature sensor 69, is stored in the storage unit 78. The processing proceeds to Step S5.

In Step S5, the detected torque of the spool shaft 2, which has been detected by the torque sensor 75, is converted into a calculated tension. The calculated tension is then corrected in accordance with both the temperature of the detection coil 75b detected by the temperature sensor 76 and the temperature of the sensor board detected by the board temperature sensor 69 for calculating a corrected tension. Specifically, the winding diameter of the fishing line wound about the spool 3 is firstly calculated based on a predetermined relational table preliminarily stored in the storage unit 78 and the number of rotations of the spool 3 detected by the spool counter 72. The predetermined relational table herein indicates the relation between the winding diameter of the fishing line wound about the spool 3 and the number of rotations of the spool 3. Next, another predetermined relational table preliminarily stored in the storage unit 78 is read out thereof, and the detected torque detected by the torque sensor 75 is converted into a corrected torque based on the read-out relational table. The predetermined relational table herein indicates the relation between the corrected torque detected by the torque sensor 75 and both the temperature of the detection coil 75b detected by the temperature sensor 76 and the temperature of the sensor board detected by the board temperature sensor 69. Subsequently, a corrected tension is calculated based on the above-calculated winding diameter of the fishing line wound about the spool 3 and the above-converted corrected torque. The corrected tension calculated in Step S5 is stored in the storage unit 78. The processing proceeds to Step S6.

In Step S6, the corrected tension stored in the storage unit 78 is read out thereof and is outputted to the display unit 79 and the communication unit 74 as numerical information. Accordingly, the corrected tension is displayed not only on the display unit 79 but also on a display unit 85 of a fishing information display device 80 through the communication between the communication unit 74 and a communication unit 86 of the fishing information display device 80.

Figure 5:
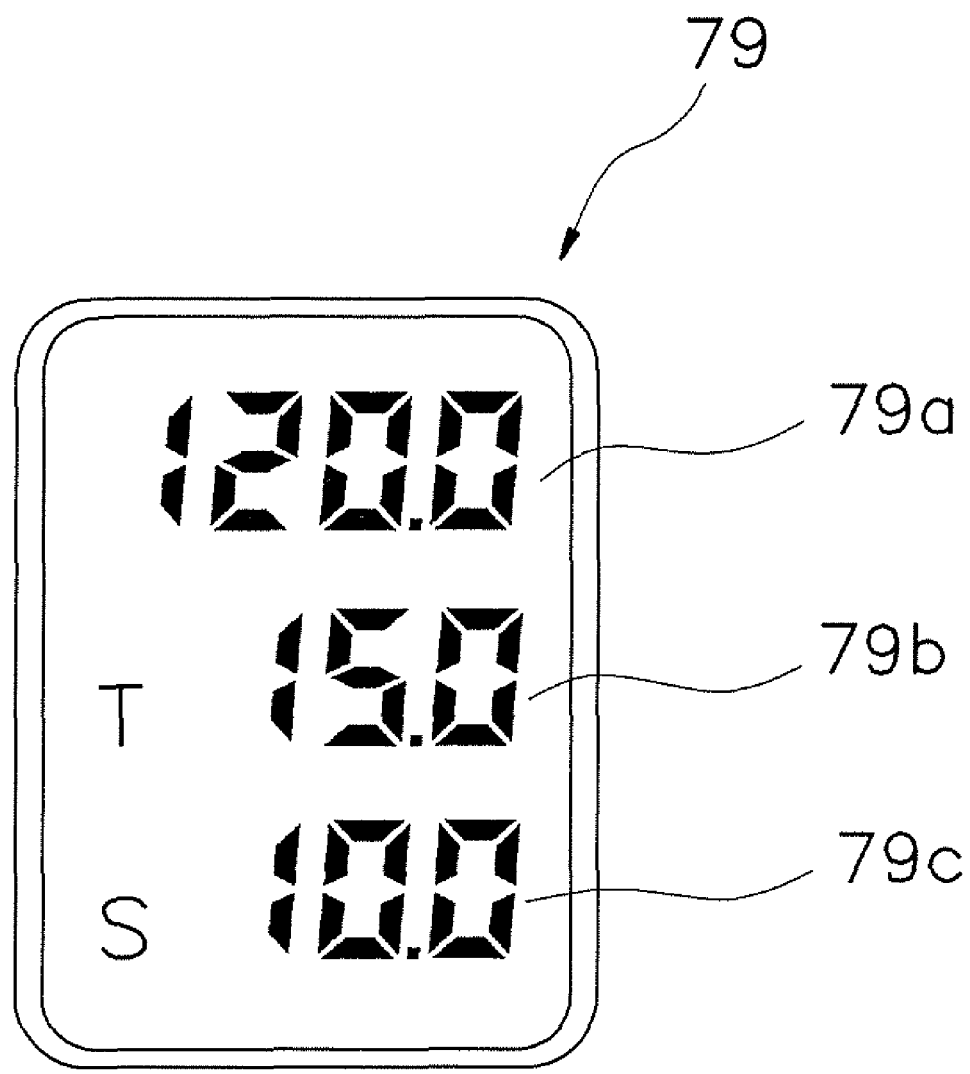
FIG. 5 is a plan view of a display unit of the fishing reel.

As illustrated in an enlarged view of FIG. 5, the display unit 79 is a segment LCD (liquid crystal display) sequentially including a fishing line length display area 79a, a torque display area 79b and a speed display area 79c from front to rear thereof (i.e., from top to bottom in FIG. 5). The fishing line length display area 79a displays the terminal tackle water depth information (i.e., fishing line length). The torque display area 79b displays the tension applied on the fishing line (i.e., corrected torque). The speed display area 79c displays the release speed of the terminal tackle or the like. Specifically, the fishing line length display area 79a is an area for displaying the terminal tackle water depth information (i.e., fishing line length), and displays "120.0" indicating a fishing line length of 120.0 m in the example of FIG. 5. The torque display area 79b is an area for displaying the tension applied on the fishing line (i.e., corrected torque), and displays both a character of "T" indicating tension and "15.0" indicating a corrected torque of 15.0 kg in the example of FIG. 5. The speed display area 79c is an area for displaying the release speed of the terminal tackle (i.e., rotation speed of the spool 3), and displays both a character of "S" indicating speed and "10.0" indicating a speed of 10.0 km/h in the example of FIG. 5.

The operating unit 77 is a roughly oval push-type button for switching back and forth the display settings of the display unit 79 and resetting the display content. Further, the display settings of the display unit 79 can be switched back and forth by an operating unit 84 disposed in the fishing information display device 80 (see FIGS. 6 and 7) provided separately from the fishing reel 100 as an external device. The fishing information display device 80 will be described below The communication unit 74 (see FIG. 7) disposed in the fishing reel 100 and the communication unit 86 (see FIG. 7) disposed in the fishing information display device 80 are electrically connected to each other through the wireless communication. As illustrated in FIG. 7, the fishing information display device 80 is configured to cause the communication unit 86 to receive the terminal tackle water depth information obtained by the fishing reel 100 and the information of a school of fish obtained by a fish finder 90 and cause the display unit 85 to display the information received by the communication unit 86.

As illustrated in FIG. 7, the communication unit 74 is allowed to send/receive a variety of information to/from the communication unit 86 of the fishing information display device 80 provided separately from the fishing reel 100 as an external device. The communication unit 74 is allowed to send the terminal tackle water depth information, the rotation speed information of the spool 3 and the information of the tension applied on the fishing line to the communication unit 86 of the fishing information display device 80.

As illustrated in FIG. 7, the fishing information display device 80 is allowed to display as echo images the information obtained from the fish finder 90, i.e., the water depth of the floor in a fishing ground and a shelf position indicating the position of a school of fish. The fish finder 90 will be described below. Further, the fishing information display device 80 is allowed to display the terminal tackle water depth information obtained from the fishing reel 100 together with the above information displayed as echo images, i.e., the water depth of the floor in a fishing ground and the shelf position.

Figure 6:
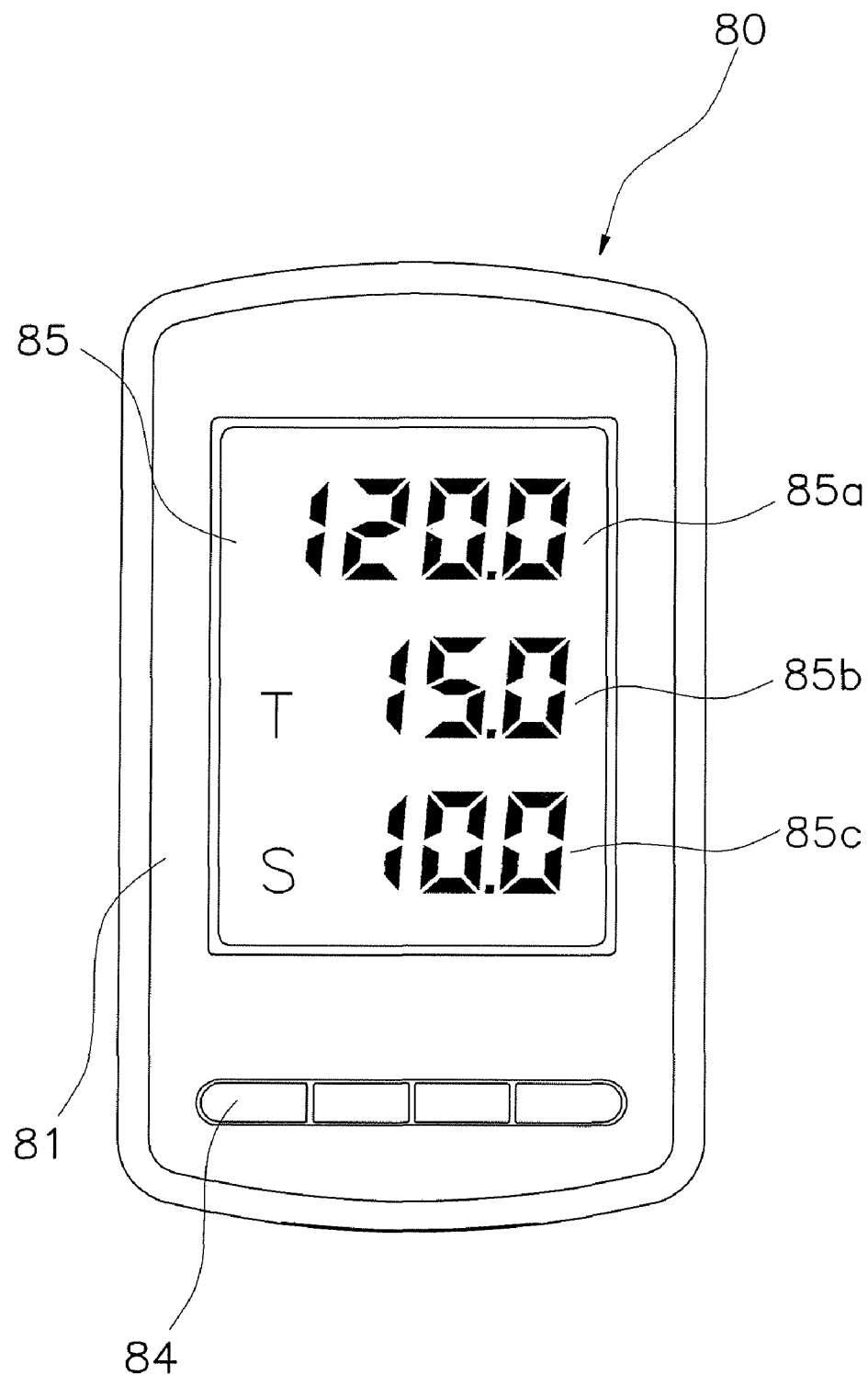
FIG. 6 is a plan view of a fishing information display device.

As illustrated in FIGS. 6 and 7, the fishing information display device 80 includes a body member 81, the communication unit 86, the display unit 85, and the operating unit 84. The body member 81 is a portrait-oriented member with a shape of a roughly rectangular cuboid. The communication unit 86 is disposed in the inside of the body member 81. The display unit 85 includes an LCD attached to the body member 81. The operating unit 84 includes a plurality of operating buttons disposed below the display unit 85 in FIG. 6.

Figure 8:
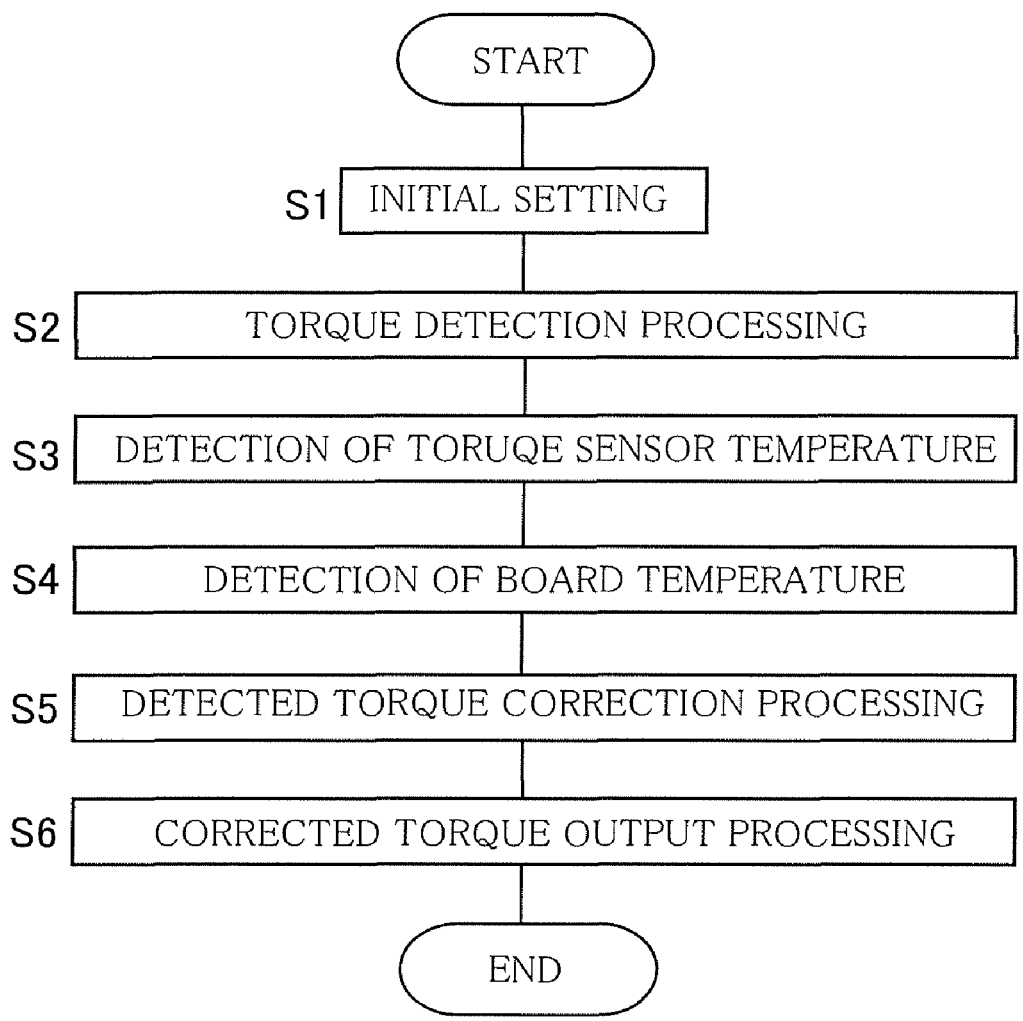
FIG. 8 is a control flowchart of a detected tension correction calculation output processing of the fishing reel.

As illustrated in FIG. 7, the fishing information display device 80 includes a control unit 83 in the inside thereof. The control unit 83 is configured to execute a variety of controls. The control unit 83 includes a microcomputer including a variety of components, such as a CPU, a RAM, a ROM, and an I/O interface, disposed in the body member 81. Based on the control program, the control unit 83 is configured to execute a variety of controls including: a display control of causing the display unit 85 to display the information obtained from the fishing reel 100 and the fish finder 90; and a control of causing the communication unit 86 to execute a variety of operations such as transmissions of a variety of command information to the fishing reel 100. Further, the control unit 83 is connected to a variety of switches of the operating unit 84, the display unit 85, the communication unit 86 and other input/output units, as illustrated in FIG. 8.

The operating unit 84 is a switch for executing a variety of controls such as a display control of the display unit 85. As illustrated in FIG. 6, the operating unit 84 includes four buttons horizontally aligned below the display unit 85. From left to right in FIG. 6, the buttons correspond to switches with the functions of "decision", "cancellation (going-back)", "up" and "down". A variety of settings is executed by operating the operating unit 84. The operating unit 84 is allowed to execute controls in the fishing reel 100 as well as controls in the fishing information display device 80.

The display unit 85 is a dot matrix LCD such as a color TFT (thin film transistor) LCD. The display unit 85 is allowed to display the information allowed to be displayed by the display unit 79 of the fishing reel 100, such as the water depth information, the tension applied on the fishing line, and the release speed of the terminal tackle. Further, the display unit 85 is allowed to display a variety of information to be obtained from the fish finder 90. As illustrated in FIG. 6, the display unit 85 is a dot matrix LCD including a fishing line length display area 85*a*, a torque display area 85*b*, and a speed display area 85*c* from top to bottom thereon in this order. The fishing line length display area 85*a* displays the terminal tackle water depth information (i.e., fishing line length). The torque display area 85*b* displays the tension applied on the fishing line (i.e., corrected torque). The speed display area 85*c* displays the release speed of the terminal tackle or the like. Specifically, the fishing line length display area 85*a* is an area for displaying the terminal tackle water depth information (i.e., fishing line length), and displays "120.0" indicating a fishing line length of 120.0 m in the example of FIG. 6. The torque display area 85*b* is an area for displaying the tension applied on the fishing line (i.e., corrected torque), and displays a character of "T" indicating tension and "15.0" indicating a corrected torque of 15.0 kg in the example of FIG. 6. The speed display area 85*c* is an area for displaying the release speed of the terminal tackle (i.e., rotation speed of the spool 3), and displays a character of "S" indicating speed and "10.0" indicating a speed of 10.0 km/h in the example of FIG. 6.

As illustrated in FIG. 7, the communication unit 86 is allowed to send/receive a variety of information to/from the communication unit 74 of the fishing reel 100 and a communication unit of the fish finder 90 through the wireless communication. The communication unit 86 receives a variety of information, such as the terminal tackle water depth data, the rotation speed information of the spool 3, the information of the tension applied on the fishing line, from the communication unit 74 of the fishing reel 100, and sends a variety of command information to the communication unit 74 of the fishing reel 100. Further, the communication unit 86 is allowed to communicate with the communication unit of the fish finder 90 and thereby receives the information of the water depth of the floor in a fishing ground, the position of a school of fish, and the like from the communication unit of the fish finder 90.

The fish finder 90 is a device for collecting the information indicating a shelf position of fish, a condition of a school of fish and a moving direction of a school of fish. As illustrated in FIG. 7, the fish finder 90 includes the communication unit for transmitting the information of a school of fish to the communication unit 86 of the fishing information display device 80 through the wireless communication. It is noted that the other components of the fish finder 90 are identical to those of the well-known fish finders. Therefore, a detailed explanation will be omitted for the other components of the fish finder 90.

According to the thus-configured fishing reel 100, the detected torque detected by the torque sensor 75 is configured to be corrected for obtaining a corrected torque in accordance with both the temperature of the detection coil 75*b* detected by the temperature sensor 76 and the temperature of the sensor board detected by the board temperature sensor 69. An angler is thereby allowed to precisely grasp the tension applied on the fishing line even when the temperature of the detection coil 75*b* and the temperature of the sensor board are increased.

Other Exemplary Embodiments (a) In the aforementioned exemplary embodiment, the fishing information display device 80 is provided separately from the fishing reel 100 as an external device and the display unit 85 of the fishing information display device 80 is configured to display the tension applied on the fishing line. However, only the display unit 79 of the fishing reel 100 can be configured to display the tension applied on the fishing line. In this case, an angler is allowed to grasp the tension applied on the fishing line only by providing the angler with the fishing reel 100 without providing the angler with the fishing information display device 80 and the fish finder 90.

(b) In the aforementioned exemplary embodiment, the torque sensor 75 includes the magnetostrictive element 75*a* and the detection coil 75*b*. The magnetostrictive element 75*a* is attached onto the tubular member 2*a* that is attached onto the outer periphery of the spool shaft 2 while being disposed between the ratchet wheel 50 of the anti-reverse mechanism 9 and the friction disc 26 of the lever drag mechanism 7. The detection coil 75*b* is held by the holder case 75*c* that is attached and fixed to the attachment board 10*a* while being disposed in the surrounding of the magnetostrictive element 75*a*. However, the arrangement of the torque sensor 75 is not be necessarily limited to the above.

(c) In the aforementioned exemplary embodiment, the temperature sensor 76 includes the first temperature sensor 76*a* and the second temperature sensor 76*b*. The first temperature sensor 76*a* is disposed on the left side of the detection coil 75*b*, whereas the second temperature sensor 76*b* is disposed on the right side of the detection coil 75*b*. The arrangement and the number of sensors included in the temperature sensor 76 is not be necessarily limited to the above.

Figure 9:
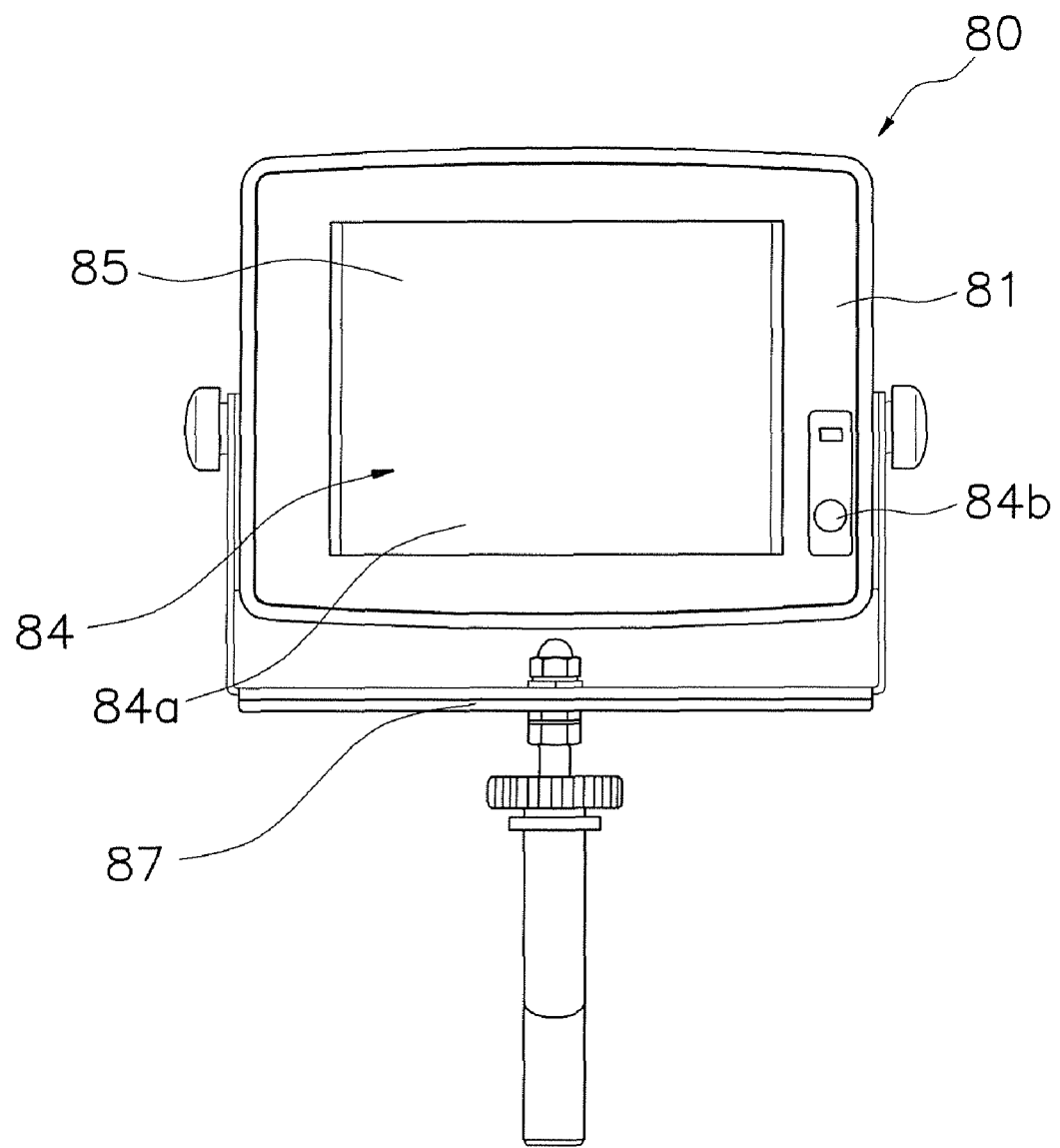
FIG. 9 is a plan view of a fishing information display device of another exemplary embodiment.

(d) In the aforementioned exemplary embodiment, the display unit 85 of the single fishing information display device 80 is configured to display the information of the single fishing reel 100, such as the terminal tackle water depth information (i.e., fishing line length), the tension applied on the fishing line (i.e., corrected torque) and the release speed of the terminal tackle. As illustrated in FIGS. 9 and 10, however, the display unit 85 of the single fishing information display device 80 can be configured to display the information obtained from a plurality of the fishing reels 100, such as the water depth information of a plurality of the terminal tackles (fishing line lengths), the tensions applied on a plurality of the fishing lines (i.e., corrected torques) and the release speeds of a plurality of the terminal tackles.

As illustrated in FIG. 9, the fishing information display device 80 includes the body member 81, the communication unit 86, the display unit 85, and the operating unit 84. The body member 81 is a landscape-oriented member with a shape of a roughly rectangular cuboid. The communication unit 86 is disposed in the inside of the body member 81. The display unit 85 includes a touch panel LCD disposed in the center part of the surface of the body member 81. The operating unit 84 includes a touch panel 84a and a power switch 84b. The touch panel 84a is disposed on the surface of the display unit 85. The power switch 84b is a push-type switch disposed lateral to the display unit 85. The touch panel 84a is allowed to execute an operation of switching back and forth the display settings of the display units 79 of the plural fishing reels 100. The power switch 84b is allowed to turn on and off the screen displayed on the display unit 85. The fishing information display device 80 is embedded with a global positioning system (GPS) module (not illustrated in the figures). The fishing information display device 80 is allowed to cause the display unit 85 to display a variety of information from the GPS through a switching operation of the touch panel 84a. The fishing information display device 80 is attached to an arm-like attachment base 87. Specifically, the both lateral portions of the body member 81 are detachably and pivotably attached thereto. The display unit 85 is allowed to be positioned at an arbitrary angle in response to the front and rear pivots of the body member 81. Further, the fishing information display device 80 includes an information input/output port (e.g., USB (universal serial bus) input/output port) connectable to the information input/output ports of the personal computers (not illustrated in the figures). For example, it is possible to input a variety of log information of the fishing reel 100 stored in the storage unit of the fishing information display device 80, such as the terminal tackle water depth information (i.e., fishing line length), the tension applied on the fishing line (i.e., corrected torque) and the release speed of the terminal tackle, into a storage unit of a personal computer through a USB input/output port of the personal computer using a USB memory. It is subsequently possible to cause a display unit of the personal computer to display the various log information of the fishing reel 100, such as the terminal tackle water depth information (i.e., fishing line length), the tension applied on the fishing line (i.e., corrected torque) and the release speed of the terminal tackle.

As illustrated in FIG. 10, the display unit 85 of the single fishing information display device 80 is configured to display the information of six fishing reels 100 on the 3×2 matrix fields thereon, such as the water depth information of six terminal tackles (i.e., fishing line lengths), the tensions applied on six fishing lines (corrected torques) and the release speeds of the six terminal tackles. In the example of FIG. 10, three fishing reels 100 are connected to the single fishing information display device 80. The display unit 85 of the single fishing information display device 80 is configured to display the information of the three fishing reels 100, such as the water depth information of three terminal tackles (i.e., fishing line lengths), the tensions applied on three fishing lines (i.e., corrected torque) and the release speed of the three terminal tackles.

As illustrated in FIG. 10, the display unit 85 is a dot matrix LCD including the 3×2 fields (referred to as first to sixth fields from the left top to right bottom), each of which includes the fishing line length display area 85a, the torque display area 85b and the speed display area 85c from top to bottom thereon. The fishing line length display area 85a displays the terminal tackle water depth information (i.e., fishing line length). The torque display area 85b displays the tension applied on the fishing line (i.e., corrected torque). The speed display area 85c displays the release speed of the terminal tackle or the like. The fishing line length display area 85a in the first field is an area for displaying the terminal tackle water depth information (i.e., fishing line length), and displays characters of "DISTANCE" and "120.0 m" indicating a fishing line length of 120.0 m in the example of FIG. 10. The torque display area 85b in the first field is an area for displaying the torque applied on the fishing line (i.e., corrected torque), and displays characters of "LINE TENSION" and "15.0 kg" indicating a corrected torque of 15.0 kg in the example of FIG. 10. The speed display area 85c in the first field is an area for displaying the release speed of the terminal tackle (i.e., rotation speed of the spool 3), and displays characters of "LINE SPEED" and "10.0 km/h" indicating a release speed of 10.0 km/h in the example of FIG. 10. In this case, the display unit 85 of the single fishing information display device 80 is allowed to display the information obtained from the plural fishing reels 100, such as the water depth information of the plural terminal tackles (i.e., fishing line lengths), the tensions applied on the plural fishing lines (i.e., corrected torques) and the release speeds of the plural terminal tackles. Therefore, an angler is allowed to timely grasp the current fishing conditions such as the information regarding whether or not fish are caught and the pulling levels of fish only by watching the information of the plural fishing reels 100 on the display unit 85 of the single fishing information display device 80.

(e) In the aforementioned exemplary embodiment, the board temperature sensor 69 is provided for detecting the temperature of the sensor board of the attachment board 10a, and the detected torque detected by the torque sensor 75 is corrected for obtaining a corrected torque in accordance with the temperature of the detection coil 75b detected by the temperature sensor 76 and the temperature of the sensor board detected by the board temperature sensor 69. However, the detected torque detected by the torque sensor 75 can be configured to be corrected for obtaining a corrected torque only in accordance with the temperature of the detection coil 75b detected by the temperature sensor 76 without providing the board temperature sensor 69.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A fishing reel attached to a fishing rod for releasing and winding a fishing line, comprising:
   a reel unit;
   a spool being rotatably attached to the reel unit, the spool being configured to wind the fishing line thereon;
   a handle being mounted to the reel unit, the handle being configured to rotate the spool;
   a tension detection section being configured to detect tension applied on the fishing line by converting the tension into an electric signal;
   a temperature detection section being disposed in a vicinity of the tension detection section, and disposed to detect temperature of the tension detection section;
   a detected tension correction section being configured to correct the tension after being detected on the basis of the temperature of the tension detection section after being detected; and
   a corrected tension output section being configured to output the tension after being corrected by the detected tension correction section.

2. The fishing reel according to claim 1, wherein the tension detection section includes a torque sensor being configured to detect the torque applied on the spool.

3. The fishing reel according to claim 2, wherein the tension detection section includes
   a magnetostrictive element being configure to change a magnetic permeability thereof on the basis of the torque applied on the spool, and
   a detection coil being disposed in a surrounding area of the magnetostrictive element, where the detection coil is configured to detect electrically a change in the magnetic permeability.

4. The fishing reel according to claim 3, wherein the temperature detection section is disposed on the both sides of the detection coil.

5. The fishing reel according to one of claim 2, further comprising:
   a drag mechanism being configured to brake rotation of the spool,
   wherein the tension detection section is configured to detect torque applied on the drag mechanism.

6. The fishing reel according to claim 5, further comprising a one-way clutch being configured to prevent the spool from reversely rotating in a fishing line release direction,
   wherein the tension detection section is attached between the one-way clutch and the drag mechanism.

7. The fishing reel according to claim 2, further comprising
   a fishing line winding diameter calculation section being configured to calculate a winding diameter of the fishing line wound about the spool; and
   a calculated tension calculation section being configured to calculate a calculated tension based on both the winding diameter calculated by the fishing line winding diameter calculation section and the detected toque detected by the tension detection section.

8. The fishing reel according to claim 7, further comprising
   a relational table reading-out section being configured to read a predetermined relational table indicating a relation between the winding diameter of the fishing line wound about the spool and a rotation speed of the spool; and
   a rotation speed detection section being configured to detect the rotation speed of the spool,
   wherein the fishing line winding diameter calculation section is configured to calculate the winding diameter of the fishing line wound about the spool based on both the predetermined relational table and the rotation speed of the spool.

9. The fishing reel according to claim 1, further comprising
   a board being attached to the reel unit, the board being configured to connect electrically the tension detection section thereto; and
   a board temperature detection section being disposed on the board, the board temperature detection section being configured to detect temperature of the board,
   wherein the detected tension correction section is configured to correct the tension after being detected by the tension detection section on the basis of both the temperature of the tension detection section and the temperature of the board.

* * * * *